United States Patent [19]
Her et al.

[11] Patent Number: 5,634,040
[45] Date of Patent: May 27, 1997

[54] DATA COMMUNICATION APPARATUS AND METHOD HAVING CONCURRENT IMAGE OVERLAY FUNCTION

[75] Inventors: Sung-min Her; Yang-hun Choi; Dong-soo Choi; In Kim, all of Seoul, Rep. of Korea

[73] Assignee: SamSung Electronics Co., Ltd., Suwon, Rep. of Korea

[21] Appl. No.: 574,346

[22] Filed: Dec. 18, 1995

[30] Foreign Application Priority Data

Dec. 19, 1994 [KR] Rep. of Korea ............ 94.35075

[51] Int. Cl.$^6$ .............................................. G06F 15/16
[52] U.S. Cl. .................... 395/502; 395/135; 395/512; 382/236
[58] Field of Search ........................ 395/135, 501, 395/502, 512, 520, 114; 382/232, 236

[56] References Cited

U.S. PATENT DOCUMENTS

| | | | |
|---|---|---|---|
| 4,954,970 | 9/1990 | Walker et al. | 395/135 |
| 4,992,782 | 2/1991 | Sakamoto et al. | 345/116 |
| 5,093,798 | 3/1992 | Kita | 395/135 |
| 5,271,097 | 12/1993 | Barker et al. | 395/135 |
| 5,283,867 | 2/1994 | Bayley et al. | 395/119 |
| 5,313,565 | 5/1994 | Mori | 395/118 |
| 5,493,638 | 2/1996 | Hooper et al. | 395/135 |

*Primary Examiner*—Kee M. Tung
*Attorney, Agent, or Firm*—Robert E. Bushnell, Esq.

[57] ABSTRACT

An integrated data communication card installed in an ISA bus slot of a multimedia personal computer capable of performing communication and overlay functions and of reducing load for the computer. Such an integrated data communication card comprises a network connector connected to a network terminal for enabling transmission of data to and from a communication network; a system connector connected to a central processing unit of the computer for enabling data transmission to and from the computer; a data processor communicable with a storage device and the network connector, for processing data in an asynchronous transfer mode received from or transmitted to the network in response to a system control signal or a first control signal; a decoder for decoding the data determined not to be processed through the network in response to the system control signal, and for decoding data determined to represent compressed motion picture data in response to a second control signal; an overlay processor for generating image overlays from the decoded data for display on a video monitor; and a transmission controller for generating the first and second control signals under control of the system control signal.

15 Claims, 2 Drawing Sheets

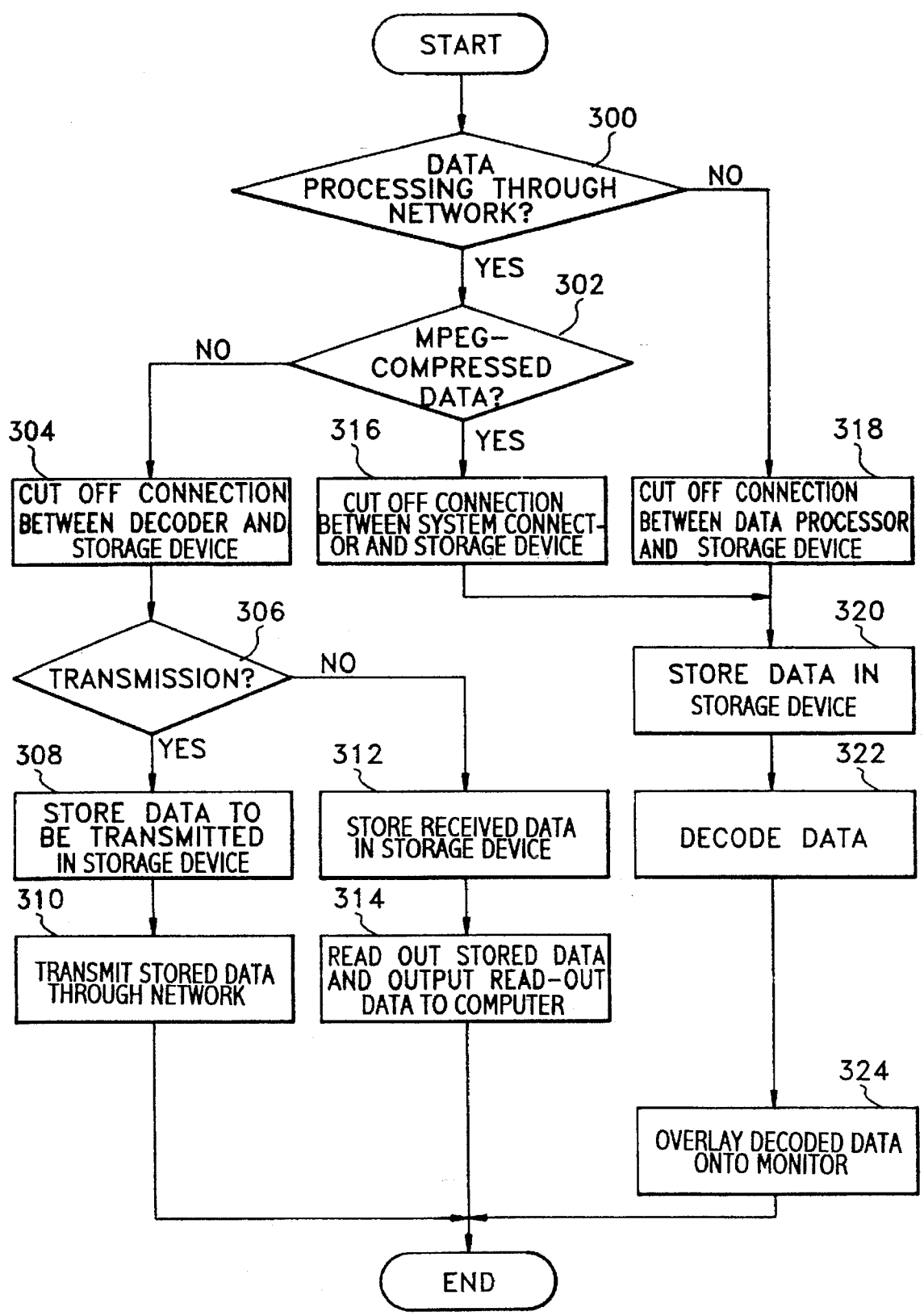

DATA COMMUNICATION APPARATUS AND METHOD HAVING CONCURRENT IMAGE OVERLAY FUNCTION

CROSS-REFERENCE TO RELATED APPLICATIONS

This application makes reference to, incorporates the same herein, and claims all benefits accruing under 35 U.S.C. §119 from an application for *Data Communication Apparatus Having Overlay Function And Data Processing Method Therein* earlier filed in the Korean Industrial Property Office on 19 Dec. 1994 and assigned Serial No. 35075/1994.

BACKGROUND OF THE INVENTION

1. Technical Field

The present invention relates to a data communication apparatus and method, and more particularly, to an integrated card for a multimedia personal computer capable of concurrently performing a network communication function and an image overlay function for a video display monitor.

2. Background Art

Data communication through a communication network is perhaps one of the most important applications commonly performed on a multimedia personal computer. The asynchronous transfer mode (ATM) was selected by the International Telegraph and Telephone Consultative Committee (CCITT), now referred to as the International Telecommunications Union (ITU), as the preferred underlying transport technology within Integrated Service Digital Networks Integrated Service Digital Networks (ISDN) and Broadband ISDN (B-ISDN) for carriage of a complete range of user traffic. Under the standard asynchronous transfer mode video, audio and text data are all broken up and transmitted in a sequence of fixed length packets, each referred to as a "cell" including 53 bytes. The transmission may be performed according to a variable bit-rate, with burst characteristics for video and audio signals, or at constant bit-rate for data information files. Video and audio (e.g. voice) signals are generally more sensitive to time delay than to loss, whereas some data signals do not require real-time transmission, but may be highly sensitive to loss.

Currently, there are products available, such as those disclosed in U.S. Pat. No. 4,954,970 for *Video Overlay Image Processing Apparatus* issued to Walker et al., U.S. Pat. No. 5,271,097 for *Method And System For Controlling The Presentation of Nested Overlays Utilizing Image Area Mixing Attributes* issued to Barker et al., and U.S. Pat. No 5,283,867 for *Digital Image Overlay System And Method* issued to Bayley et al., which allow a multimedia personal computer to process high quality audio, text, graphics, animation and special effects data received from either an external communication network or the computer central processing unit for video display. Conventionally however, the network communication card and the video overlay card are constructed and installed separately and must therefore transfer information over the computer bus.

High-resolution motion picture data having a relatively rapid frame rate (e.g. 15-30 frames per second), sometimes accompanied by audio data, are typically compressed according to a compression technique designated MPEG-1, the first standard codex algorithm recommended by the Motion Picture Expert Group, a committee of Working Group 8 in the International Standards Organization (ISO), although similar H.261 or later protocols recommended the CCITT (ITU) or other organizations are occasionally used. The well known MPEG-1 compression technique is able to convert video data captured at up to 27 MB per second to more manageable data rates for transfer and storage, by performing both intraframe and interframe compression. Intraframe compression refers to a plurality of techniques performed on each frame, beginning with image scaling, luminance and chrominance separation, and color subsampling to discard most of the chrominance information. Each 8×8 pixel block is then encoded by a Discrete Cosign Transform (DCT) into a set of numbers describing a level of image detail, and the DCT numbers are divided by a constant and rounded off in a quantitizion step. Finally, each string of identical quantitized numbers is run-length encoded to assign a small token indicating simply the value and the number of times it repeats, then the tokens are converted into to variable length symbols called Huffman codes. Further compression is achieved with interframe techniques using motion prediction and motion detection to eliminate redundant blocks appearing in more than one frame. MPEG decompression boards, such as Sigma Designs' RealMagic card, decode compressed motion picture data at up to 30 frames per second (fps) according to overall system capabilities, and use an overlay processor to punch a hole in a simultaneously displayed graphics image in order to play the decoded motion pictures within an empty Window on the video monitor. The overlay image is sometimes provided directly to a separate graphics card through a feature connecter, but the graphics image processing circuitry may also be incorporated onto the same card as the decompression and image overlay processor. Higher compression ratios reduce the bandwidth requirements, but generate a corresponding increase in image artifacts produced by data lost during compression.

Compressed image and audio data, encoded according to a designated compression codex, such as MPEG-1, electronic mail data and other text data received through a dedicated network communication card, are conventionally transferred via the well known 8-bit Industry Standard Architecture (ISA) bus to a computer storage medium (e.g., a hard disk), then the MPEG compressed data are supplied to a decompression and overlay processor via the same ISA bus. The aforementioned conventional technique for sequentially performing communication, decompression, and image overlay functions often places a heavy operating burden on the central processing unit (CPU), the computer storage medium, and the ISA bus. As a result, overall system performance can deteriorate, and the ISA bus may be unavailable for use by other devices during the communication process. Even a faster wide computer bus, such as the 16-bit Extended Industry Standard Architecture (EISA) bus, capable of up to 4 MB per second, and the competing 32-bit local bus standards set forth by VESA and PCI, are unable to address the operating burden placed on the central processing unit and computer storage medium by the conventional data communication techniques. Accordingly, while communication network cards and decompression and overlay cards are known in the art, they have not previously been combined into an integrated device capable of effective responding to the increased demands imposed by processing of compressed data on a multimedia computer system.

SUMMARY OF THE INVENTION

Accordingly, it is an object of the present invention to provide a data communication apparatus for efficiently transferring multimedia data to a video display.

It is another object to provide an integrated data communication card installed in a multimedia personal computer capable of concurrently enabling communication via a network and performing an overlay function for motion picture video display without transmitting the data over the computer bus.

These and other objects can be achieved with a integrated data communication card installed in an Industrial Standard Architecture or other bus slot of a multimedia personal computer, capable of concurrently performing data communication and overlay functions. The integrated card includes a network connector, a system connector, a data processor, a storage device, a decoder, an overlay processor, and a transmission controller. A computer bus connects a central processing unit of a computer to the system connector, for enabling transmission of computer control signals and data between the central processing unit and the decoder, network connector, transmission controller, and storage device. The network connector is connected to the data processor and a network terminal for enabling transmission of data to and from an external network. The data processor is connected to the network connector and storage device for processing data in an asynchronous transfer mode in response to a computer control signal, but is disconnected from the storage device in response to a first control signal. The decoder is connected to the storage device for decompressing stored compressed motion picture data in response to a computer control signal, but is disconnected from the storage device by a second control signal. The overlay processor is connected to the decoder, for processing decoded motion picture data received from the decoder to generate overlays for display on a video monitor. The storage device is connected to the data processor, decoder, and system connector for enabling reading and writing of data in response to a computer control signal, but is disconnected from the system connector in response to a third control signal. Transmission controller 108 generates the first, second, and third control signals under control of the central processing unit.

The data processing method practiced according to the principles of the present invention is performed by an integrated card having concurrent data communication and overlay functions, and including a network connector for transferring network data to and from a external communication network, a storage device for storing data, a data processor communicable with the network connector for processing data in an asynchronous transfer mode, a decoder for decoding (i.e., decompressing) compressed data, an overlay processor and a system connector connected to a central processing unit of a in which the integrated card is installed. The method contemplates determining whether data received by the integrated card are network data for processing through the communication network and then determining whether the network data represent compressed motion picture data. When the network data do not represent compressed motion picture data, a connection between the decoder and the storage device is cut off, and a first determination is made of whether the network data are to be transmitted through the communication network or were received from the communication network, the network data being stored and either transmitted through the communication network or to the central processing unit of the computer in accordance with the first determination. When the network data represent compressed motion picture, cutting off connection between the system connector and the storage device, and storing the compressed motion picture data in the storage device after it is processed by the data processor. When the data received by the integrated card do not represent network data, i.e., compressed motion picture data sent through the system connector from the computer, a connection between the data processor and the storage device is cut off, and the received data is stored in the storage device. Compressed motion picture data stored in the storage device is decompressed in the decoder and processed for video display by the overlay processor.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings, in which like reference symbols indicate the same or similar components, wherein:

FIG. 2 is a flow chart explaining a data processing method for operating the data communication card of FIG. 1 according to the principles of the present invention.

DETAILED DESCRIPTION OF THE PREFERRED EMBODIMENT

Figure 1:
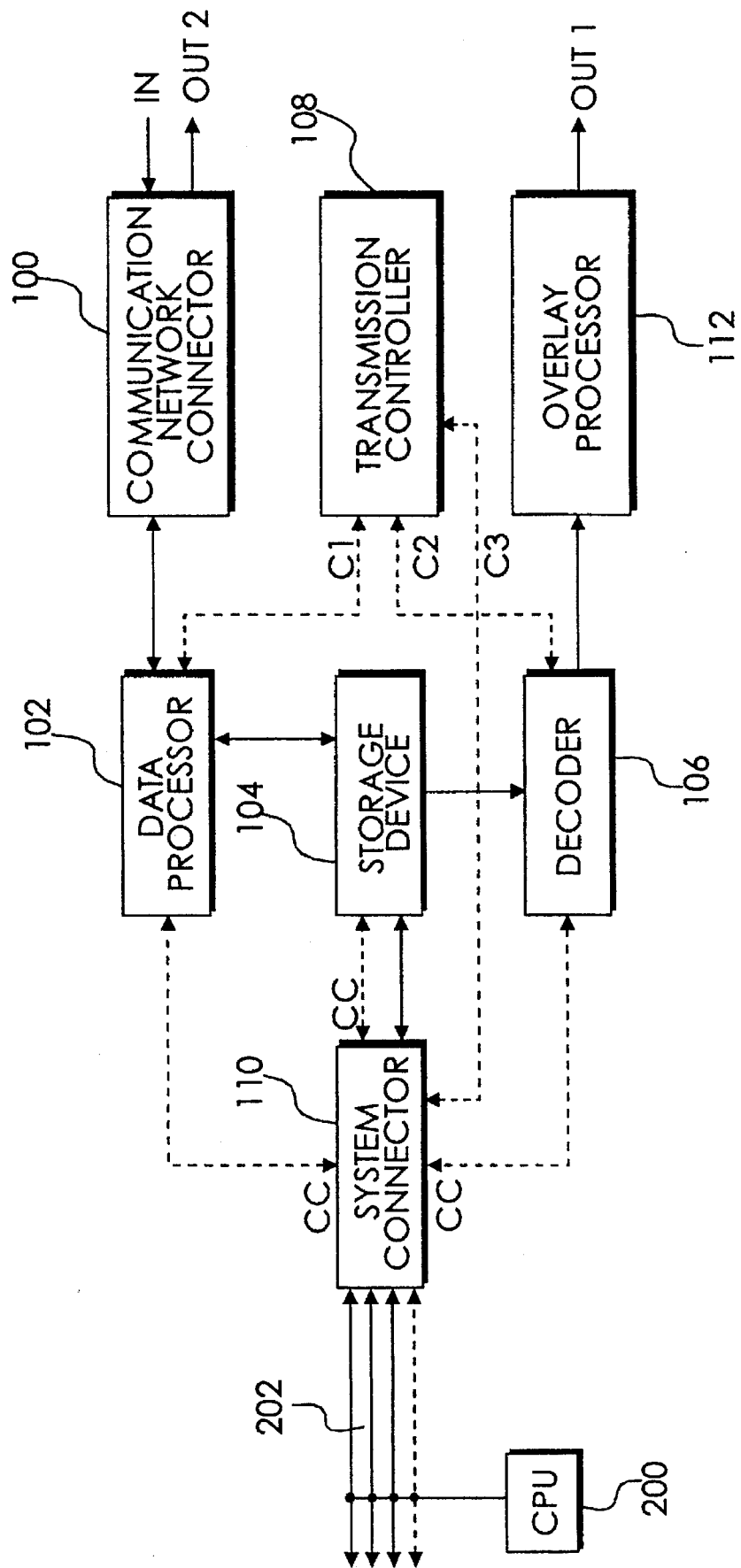
FIG. 1 is a block diagram illustrating an integrated data communication card constructed according to the principles of the present invention, having a network communication and overlay function and installed in a bus slot of a computer.

Referring first to FIG. 1, the data communication card may be constructed with a communication network connector 100, a data processor 102, a storage device 104, a decoder 106, a transmission controller 108, a system connector 110 and an overlay processor 112. Solid lines in FIG. 1 show transmission routes of data signals, while dotted lines show transmission routes for control signals. The communication network connector 100 is connected to a network terminal for enabling transmission of data to and from a communication network. The system connector 110 is connected to a central processing unit 200 of a multimedia personal computer (not shown) for enabling transmission of data and control signals to and from the computer, via a card connector of a computer bus 202. The computer bus 202 is preferably an Industry Standard Architecture bus having a plurality of data and control signal lines, although alternative standard bus structures may instead be used.

The data processor 102 is connected between the storage device 104 and the network connector 100, for processing data received from the communication network or delivered to the network connector 100 in an asynchronous transfer mode in response to a computer control signal CC. The decoder 106 is connected between the storage device 104 and the overlay processor 112 for decoding stored compressed motion picture data for overlay display in response to a computer control signal CC. The transmission controller 108 generates first, second, and third control signals C1, C2, C3 in response to instructions transmitted as computer control signals from the central processing unit 200, either through direct connection to the computer bus or a signal line (not shown) between the central processing unit 200 and the transmission controller.

FIG. 2 is a flow chart illustrating a data processing method according to the principles of the present invention, executed by the data communication apparatus as further described hereinafter in conjunction with FIG. 1. A central processing unit 200 of a multimedia personal computer connected through computer bus 202 to the data communication apparatus, initially determines in step 300 whether the data communication apparatus is processing network data.

That is, the central processing unit 200 determines whether data is to be processed for transmission by the communication network, or data received by the communication network is to be processed for transmission to the computer. If the central processing unit 200 determines in step 300 that network data are to be processed, it then checks in step 302 whether the network data are MPEG-compressed data, on the basis of information received during a call set-up step (not shown) occurring before data is transmitted over the network. When the network data are determined not to be MPEG-compressed data, such as electronic mail data or other text data, the central processing unit 100 instructs the transmission controller 108 to prevent the network data determined not to be MPEG-compressed from being decoded by the decoder 106. That is, in step 304 the central processing unit 200 instructs the transmission controller 108 to generate a second control signal C2 disconnecting the decoder 106 from the storage device 104. In the practice of the present invention, it should be noted that the storage device 104 according to the principles of the present invention is preferably constructed as a memory device shared by data processor 102, system connector 110 and decoder 106. The data processor 102 is preferably constructed for processing data in an asynchronous transfer mode and communication network connector is preferably connected to an integrated service digital network or compatible communication network.

After the transmission controller 108 in step 304 cuts off a data transmission route between the decoder 106 and the storage device 104, the central processing unit 200 determines in step 306 whether the network data are to be transmitted to the computer or through the communication network. If the data are to be transmitted through the communication network, in step 308 the transmission controller 108 connects a data transmission route between the system connector 110 and the storage device 104 using a third control signal C3, to enable storage of the data in the storage device 104, then connects a data transmission route between the storage device 104 and data processor 102 using a first control signal C1, in order to enable the central processing unit 200 to control the data processor 102 to read out the data stored in the storage device 104 and process the data for transmission over the communication network in the asynchronous transfer mode. The communication network connector 100 is constructed to transmit data processed by the data processor 102 to the communication network in step 310 via a second output port (OUT2).

When electronic mail or text data are received from the communication network, the central processing unit 200 in step 312 instructs the transmission controller 108 to generate a first control signal C1 to establish a data transmission route between the data processor 102 and the storage device 104, in order to store the received data in the storage device 104, then in step 314 instructs the transmission controller 108 to generate a third control signal C3 to establish a data transmission route between the storage device 104 and the system connector 110, in order to transmit the stored data through the system connector 110 to the computer. The communication network connector 100 is constructed to convert electrical signals received from the communication network via an input port (IN) into asynchronous transfer mode signals representative of electronic mail, text, and MPEG-compressed data.

When the network data checked in step 302 is MPEG-compressed data, the central processing unit 200 in step 316 instructs the transmission controller 108 to generate a third control signal C3 to cut off the data transmission route between the system connector 110 and the storage device 104, and then in step 320 instructs the transmission controller 108 to generate the first control signal C1 so as to establish a data transmission route between the data processor 102 and the storage device 104 for storing the MPEG-compressed network data.

Returning now to step 300, if the data are determined not to be network data but are instead MPEG-compressed generated by the computer for local display, the central processing unit 200 in step 318 instructs the transmission controller 108 to generate the first control signal C1 to cut off the data transmission mute between the data processor 102 and the storage device 104. The central processing unit 200 in step 320 then instructs the transmission controller 108 to generate the third control signal C3 so as to establish a data transmission route between the system connector 110 and the storage device 104 for storing MPEG-compressed data received from the computer.

Regardless of the source of the MPEG-compressed data stored in step 320 in the storage device, the central processing unit 200 in step 322 instructs the transmission controller 108 to generate the second control signal C2 so as to establish a data transmission route between the storage device 104 and the decoder 106 for decompressing the stored data. The decompressed data are then processed in step 324 by the overlay processor 112 to generate overlay images for display on a video monitor after being transferred through a first output port (OUT1). The overlay images may be directly supplied to a graphics video card for insertion in a Window formed in a background graphics image.

As described above, the data communication apparatus having a concurrent data communication and overlay function constructed according to the principles of the present invention, and the corresponding data processing method, advantageously reduce the load on the central processing unit, the computer storage device, and the computer bus, thereby enabling the multimedia personal computer to enhance its multimedia display performance.

It should be understood that the aforementioned MPEG-compressed data is preferably motion picture video data compressed according to a standard protocol recommended by the Motion Picture Expert Group, such as the previously described MPEG-1, but that other present and future compression protocols may alternatively be used. A broadband integrated service digital network using the asynchronous transfer mode is capable of supplying compressed motion picture data at a rate far exceeding the capabilities of a telephone modem, hard disk or optical storage device. Accordingly, it is advantageous to provide a network transmission card with an on-board decoder and overlay processor to avoid overburdening the central processing unit, computer storage device, or computer bus. The data communication apparatus as constructed according to the principles of the present invention is an integrated card preferably insertable in an Industry Standard Architecture or similar bus slot of a computer.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A data communication card installed in bus slot of a computer for performing both a data communication function and an image overlay function, comprising:

a network connector connected to a network terminal, for enabling transmission of data to a network;

a system connector connected to a central processing unit of the computer, for enabling transmission of data to and from the computer;

a decoder for decompressing compressed motion picture data in response to a computer control signal, a transmission controller for generating a first control signal, a second control signal, and third control signal in response to computer control signals generated by the central processing unit of the computer;

a data processor response to said computer control signal and communicable with said network connector, for processing data received from the network in an asynchronous transfer mode for storage, and for processing stored data to be delivered to said network connector in the asynchronous transfer mode in response;

a shared storage device for storing data transferred between respective ones of said data processor, said decoder, and said system connector in dependance upon said first control signal, said second control signal, and said third control signal; and an overlay processor for processing said decompressed motion picture data from said decoder and generating overlays for display by a video monitor.

2. The data communication card as recited in claim 1, wherein said system connector is connected to a central processing unit of the computer through an Industrial Standard Architecture bus.

3. The data communication card as recited in claim 1, wherein said compressed motion picture data represent images compressed according to a Motion Picture Expert Group recommended protocol.

4. The data communication card as recited in claim 1, wherein said decoder decodes data compressed using both interframe and intraframe techniques.

5. A data processing method for an integrated card in a computer system, the integrated card having an overlay processor, a network connector for communicating data with a communication network, a storage device for storing data, a data processor communicable with the network connector for processing data in an asynchronous transfer mode, a decoder for decoding compressed data, and a system connector connected to a central processing unit of the computer system, said data processing method comprising the steps of:

determining whether data received by said integrated card are network data for processing through said communication network;

when the data processed by said integrated card are determined to be network data, checking whether the network data represent compressed motion picture data;

when the network data do not represent compressed motion picture data, cutting off connection between said decoder and said storage device;

determining whether network data not representing compressed motion picture data are data received from the central processing unit of the computer or data received from the communication network;

when the network data represent compressed motion picture data, cutting off connection between said system connector and said storage device, and storing said compressed motion picture data in said storage device after it is processed by said data processor;

when the data received by said integrated card are determined not to be network data, cutting off connection between said data processor and said storage device, and storing the data in said storage device; and decoding compressed motion picture data stored in said storage device and generating overlay images of the decoded data for video display.

6. The data processing method as claimed in claim 5, further comprising the steps of:

when network data not representing compressed motion picture data are determined to be data received from the central processing unit of the computer, storing said data in said storage device;

transmitting the stored network data received from the central processing unit of the computer through said communication network;

when network data not representing compressed motion picture data are determined to be data received from the communication network, storing said data in said storage device; and reading the stored network data received from the communication network for transmission to the central processing unit of the computer.

7. The data processing method as recited in claim 5, wherein said compressed motion picture data represent images compressed according to a Motion Picture Expert Group recommended protocol.

8. The data processing method as recited in claim 5, wherein said step of decoding compressed motion picture images comprises decompressing images compressed using both interframe and intraframe compression techniques.

9. The data processing method as recited in claim 5, wherein said system connector of said integrated card communicates with the central processing unit of the computer through an Industry Standard Architecture bus.

10. The data processing method as recited in claim 5, wherein said network data determined not to represent compressed motion picture data, represent one of text data and electronic mail data.

11. The data processing method as recited in claim 10, wherein said compressed motion picture data represent images compressed under a protocol recommend by the Motion Picture Expert Group.

12. The data processing method as recited in claim 11, said step of decoding the stored compressed motion picture data comprises decompressing images compressed using both interframe and intraframe compression techniques.

13. A method for processing video data in an integrated card installed in a computer having a central processing unit, said method comprising the steps of:

determining whether data received by said integrated card are data to be processed through a communication network, or alternatively are data received from the central processing unit of the computer for display on a video monitor;

when the data received by said integrated card are determined to be data not to be processed through said communication network, storing the data in a storage device, decoding the stored data from said storage device, and generating overlay images of the decoded data for display on a video monitor;

when the data are determined to be data to be processed through said communication network, checking whether the data represent compressed motion picture data;

when the data determined to be processed through said communication network represent compressed motion picture data, storing the compressed motion picture data in said storage device, decoding the stored compressed motion picture data, and generating overlay images of the decoded motion picture data for display on said video monitor;

when the data to be processed through said communication network are determined not to represent compressed motion picture data, determining whether the data are received from the central processing unit of the computer to be transmitted through said communication network, or alternatively, are data received from said communication network;

when the data are determined to be received from the central processing unit of the computer for transmission through said communication network, storing the data in said storage device and transmitting the stored data through said communication network; and when the data determined to be received from said communication network are determined not to represent compressed motion picture data, storing the data received from said communication network in said storage device and transmitting the stored data to the central processing unit of the computer.

14. The data processing method as recited in claim 13, wherein said data determined not to represent compressed motion picture data represent one of text data and electronic mail data.

15. The data processing method as recited in claim 13, wherein said integrated card is connected to the central processing unit of the computer through said system connector over an Industry Standard Architecture bus.

* * * * *